United States Patent
Peng et al.

(10) Patent No.: US 10,364,311 B2
(45) Date of Patent: Jul. 30, 2019

(54) HFO-1234ZE COPOLYMERS

(71) Applicant: THE CHEMOURS COMPANY FC, LLC, Wilmington, DE (US)

(72) Inventors: Sheng Peng, Hockessin, DE (US); Phan Linh Tang, West Chester, PA (US); Ming Hong Hung, Wilmington, DE (US); Ronald Earl Uschold, West Chester, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 15/532,063

(22) PCT Filed: Dec. 1, 2015

(86) PCT No.: PCT/US2015/063144
§ 371 (c)(1),
(2) Date: May 31, 2017

(87) PCT Pub. No.: WO2016/094121
PCT Pub. Date: Jun. 16, 2016

(65) Prior Publication Data
US 2017/0342177 A1    Nov. 30, 2017

Related U.S. Application Data

(60) Provisional application No. 62/101,096, filed on Jan. 8, 2015, provisional application No. 62/089,329, filed on Dec. 9, 2014.

(51) Int. Cl.
C08F 214/20 (2006.01)
C08F 214/18 (2006.01)
C08F 214/26 (2006.01)
C08J 5/18 (2006.01)
C09D 127/12 (2006.01)

(52) U.S. Cl.
CPC ........ C08F 214/182 (2013.01); C08F 214/20 (2013.01); C08F 214/26 (2013.01); C08F 214/265 (2013.01); C08J 5/18 (2013.01); *C08J 2327/12* (2013.01); *C08J 2327/18* (2013.01); *C09D 127/12* (2013.01)

(58) Field of Classification Search
CPC .............. C08F 214/182; C08F 214/265; C08F 214/20; C08F 214/26; C08J 5/18
See application file for complete search history.

(56) References Cited

U.S. PATENT DOCUMENTS

| | | |
|---|---|---|
| 4,626,587 A | 12/1986 | Morgan et al. |
| 8,163,858 B2 * | 4/2012 | Samuels ............... B60C 1/0008 |
| | | 526/249 |
| 2007/0253655 A1 | 11/2007 | Egami et al. |
| 2012/0208007 A1 | 8/2012 | Mukhopadhyay et al. |
| 2014/0008987 A1 | 1/2014 | Tyagi et al. |
| 2014/0147480 A1 * | 5/2014 | Lu .......................... A01N 29/02 |
| | | 424/405 |
| 2014/0339167 A1 * | 11/2014 | Lu .......................... B01D 71/32 |
| | | 210/650 |

FOREIGN PATENT DOCUMENTS

| | | |
|---|---|---|
| EP | 2 455 408 A1 | 5/2012 |
| WO | 2008/07988 A1 | 7/2008 |
| WO | 2015/049456 A1 | 4/2015 |

OTHER PUBLICATIONS

PCT International Search Report and Written Opinion dated Dec. 1, 2015.

* cited by examiner

*Primary Examiner* — Peter D. Mulcahy

(57) ABSTRACT

The present invention provides 1,3,3,3-tetrafluoropropene (HFO-1234ze) copolymers comprising 1,3,3,3-tetrafluoropropene and one or more comonomers selected from the group consisting of vinyl fluoride (VF), vinylidene fluoride ($VF_2$), tetrafluoroethylene (TFE), chlorotrifluoroethylene (CTFE), hexafluoropropylene (HFP), and perfluoro(alkyl vinyl ether) (PAVE), wherein said alkyl contains 1 to 5 carbon atoms, the copolymers being a fluoroplastic or a fluoroelastomer, depending upon monomer content.

3 Claims, No Drawings

HFO-1234ZE COPOLYMERS

CROSS-REFERENCES TO RELATED APPLICATIONS

This application claims the benefit of U.S. Provisional Application No. 62/89,329, filed Dec. 9, 2014, and U.S. Provisional Application 62/101,096, filed Jan. 8, 2015, which are incorporated by reference herein in their entirety.

BACKGROUND INFORMATION

Field of the Disclosure

This invention relates to the polymerization of HFO-1234ze ($CF_3CH=CHF$, 1,3,3,3-tetrafluoropropene) with other copolymerizable fluorinated monomers and the obtained HFO-1234ze copolymers.

Description of the Related Art

U.S. Patent Publication 2012/0208007 addresses the need for a barrier coating on a reflective layer applied to the back of a glass substrate to protect the reflective property of the reflective layer. The barrier coating provided in this reference is a thermosetting polymer that contains a substantial amount of a polymer having the polymeric segment of the formula $-[CR_1CF_3-CR_2R_3]-$, wherein $R_1$, $R_2$, and $R_3$ are independently selected from H and F [0010]. A variety of hydrofluoroolefins (HFOs) may be used to form the polymer, HFO-1234yf (2,3,3,3-tetrafluoropropene, $CF_3CF=CH_2$) is disclosed as a compound that is suitable [0025]. Other suitable compounds are HFO-1234zf ($CF_3CH=CH_2$), HFO-1234ze, and HFO-1225 (pentafluoropropene) [0026]. These compounds may be copolymerized with additional monomers, mentioning about twenty five of such monomers [0027]. The sole Example uses a solution of 1234yf as the coating composition.

U.S. Pat. No. 8,163,858 addresses the need for a moisture barrier and an oxygen barrier and provides a film containing vinylidene fluoride copolymerized with a fluorinated comonomer as the barrier, the film containing 50 wt % to 99 wt % of the vinylidene fluoride for the oxygen barrier and 0.1 to 50 wt % vinylidene fluoride for the moisture barrier, the fluorinated comonomer amount being 0.1 wt % to 50 wt %, and 50 wt % to 99.9 wt %, respectively (col. 2, l. 18-36). The preferred fluorinated comonomers are 2,3,3,3-tetrafluoropropene, 1,1,3,3,3-pentafluorpropene, 2-chloro-pentafluoropropene, hexafluoropropylene, trifluoroethylene, chlorotrifluoroethylene, 3,3,3-trifluoro-2-trifluoromethylpropene, and a mixture thereof (col. 3, l. 33-37). Other fluorinated comonomers are disclosed to be useful in modest amounts, mentioning greater than 40 of such comonomers, including the cis and trans isomers of 1234ze. HFO-1234yf is the only HFO used in the vinylidene fluoride copolymers of the Examples.

U.S. Patent Publication 2014/008987 discloses the copolymerization of 2,3,3,3-tetrafluoropropene, 1,3,3,3-tetrafluoropropene, or 1-chloro-2,3,3-tetrafluoropropene with ethylenically unsaturated monomers [0007]. A number of hydrocarbon ethylenically unsaturated monomers are disclosed along with HFP, the ethylenically unsaturated monomer constituting 30 to 95 mol percent of the copolymer [0009], [0100]. The Examples are all directed to the copolymerization of 2,3,3,3-tetrafluoropropene (1234yf) with ethylene.

It is apparent that any reason for interest in fluoropolymers containing HFO-1234ze as a comonomer is missing from '007 and '858.

SUMMARY

It has been discovered that HFO-1234ze has copolymerization capability not possessed by HFO-1234yf. It has also been discovered that HFO-1234ze copolymerizes at a faster rate than hexafluoropropylene that is present in many fluoropolymers, i.e. fluoroplastics and fluoroelastomers. It has further been discovered that once incorporated into the fluoropolymer in place of hexafluoropropylene, the thermal stability of the fluoropolymer improves.

These discoveries and other advantages are embodied in the HFO-1234ze copolymers of the present invention, which can be described as copolymer comprising 1,3,3,3-tetrafluoropropene (1234ze) and one or more comonomers selected from the group consisting of vinyl fluoride (VF), vinylidene fluoride ($VF_2$), tetrafluoroethylene (TFE), chlorotrifluoroethylene (CTFE), hexafluoropropylene (HFP), and perfluoro(alkyl vinyl ether) (PAVE), wherein said alkyl contains 1 to 5 carbon atoms.

The copolymer can be a fluoroplastic or a fluoroelastomer, depending upon its monomer content.

When the copolymer is a fluoroelastomer, the 1234ze is a cure site for the fluoroelastomer. The function of the 1234ze monomer as a cure site in the copolymer can be described as the process comprising forming by copolymerization the copolymer comprising 1,3,3,3-tetrafluoropropene (1234ze) and one or more comonomers selected from the group consisting of vinyl fluoride (VF), vinylidene fluoride ($VF_2$), tetrafluoroethylene (TFE), hexafluoropropylene (HFP), and perfluoro(alkyl vinyl ether) (PAVE), wherein said alkyl contains 1 to 5 carbon atoms and curing said copolymer.

In one embodiment, the 1234ze can be present in the copolymer in place of some or all of the HFP. When HFP is present in the copolymer along with the 1234ze, then preferably at least one other comonomer that is copolymerizable with the 1234ze and HFP is present, preferably a fluoroolefin, more preferably $VF_2$ and/or TFE.

In another embodiment, the copolymer comprises the 1234ze and VF. Preferably, the amount of 1234ze in the copolymer is at least 18 mol %.

In another embodiment, the copolymer comprises the 1234ze, VF and TFE.

In another embodiment, the copolymer comprises the 1234ze, the TFE, and the $VF_2$ and optionally the HFP.

In another embodiment, the copolymer comprises the 1234ze, the TFE and optionally, the HFP.

In another embodiment, the copolymer comprises the 1234ze, the TFE, and ethylene and optionally the HFP.

In another embodiment, the copolymer comprises the 1234ze, CTFE and ethylene or 1234ze, CTFE, TFE, and ethylene, either copolymer optionally comprising modifying monomer described hereinafter.

In another embodiment, the copolymer comprises the 1234ze, the TFE, the $VF_2$, and optionally the HFP.

In another embodiment, the copolymer is a fluoroelastomer, comprising the 1234ze and either the $VF_2$ or the perfluoro(alkyl vinyl ether), preferably perfluoro(methyl vinyl ether) (PMVE). In a preferred aspect of this embodiment, the copolymer (fluoroelastomer) comprises the 1234ze, the $VF_2$, the TFE, and optionally, the HFP. Preferably, this copolymer (fluoroelastomer) additionally comprises the HFP. In another preferred aspect of this embodiment, the 1234ze/$VF_2$/TFE copolymer (fluoroelastomer)

additionally comprises the perfluoro(alkyl vinyl ether), preferably PMVE. In another embodiment, the copolymer (fluoroelastomer) comprises the 1234ze, the TFE and the perfluoro(alkyl vinyl ether), preferably PMVE.

Examples of copolymers of the present invention include the following:

Fluoroplastics:
1234ze/VF
1234ze/VF/TFE
1234ze/TFE
1234ze/TFE/HFP
1234ze/TFE/ethylene
1234ze/TFE/HFP/ethylene
1234ze/CTFE/ethylene
1234ze/CTFE/TFE/ethylene
1234ze/TFE/VF$_2$
1234ze/TFE/VF$_2$/HFP
1234ze/VF$_2$ Fluoroelastomers:
1234ze/VF$_2$
1234ze/VF$_2$/HFP
1234ze/VF$_2$/TFE
1234ze/VF$_2$/TFE/HFP
1234ze/VF$_2$/TFE/PMVE
1234ze/TFE/PMVE The monomers present in these fluoroplastics and fluoroelastomers are present in an effective amount to obtain the plastic or elastomer nature indicated.

DETAILED DESCRIPTION

The HFO-1234ze used in the present invention can be the cis or trans isomer configuration or can be a mixture of these isomers.

For simplicity, the copolymers of the present invention are described in terms of the monomers from which they are obtained by copolymerization. These monomers are present in the copolymer as repeat units, e.g. —CF$_2$—CF$_2$— for TFE, —CH$_2$—CHF— for VF, —CH$_2$—CF$_2$— for VF$_2$, —CCF$_3$—CF$_2$— for HFP, —CF$_2$—CFOCF$_3$— for PMVE, —ClFC—CF$_2$— for CTFE, and —CHCF$_3$—CHF— for 1234ze.

The term copolymer(s) used herein includes polymers comprising two or more comonomers. Thus, the 1234ze copolymers of the present invention include copolymers of 1234ze with at least one additional comonomer. The term copolymer(s) includes dipolymers, terpolymers, quatrapolymers, and even copolymers containing a greater number of comonomers.

With reference to the copolymers of the present invention: The transitional terms "comprises", "comprising", "includes", "including", "has", "having" or any other variation thereof cover the presence of comonomers in addition to those specifically identified in copolymers. The transitional phrase "consisting of" excludes the presence of such additional comonomers in the copolymer. The transitional phrase "consisting essentially of" includes comonomers in addition to those literally disclosed provided that these additional included comonomers do not materially affect the basic and novel characteristic(s) of the claimed invention. The term "consisting essentially of" occupies a middle ground between "comprising" and "consisting of." While the preferred transitional term for the copolymers of the present invention is "comprising" or the like as described above, it is also contemplated that the transitional terms "consist of" and the like or "consisting essentially of" can apply to one or more or all of these copolymers.

The term elastomer in fluoroelastomer refers to the copolymer exhibiting rubbery character, i.e. being capable of recovering its original shape after being stretched to high elongation, e.g. at least 50%. The copolymer is considered a fluoroelastomer whether exhibiting its elastomer character as-polymerized or only after curing. In contrast, fluoroplastics are not rubbery, but instead are rigid and in thin sections, flexible.

With Respect to Fluoroplastics:

Preferred fluoroplastic copolymers of 1234ze with VF include dipolymers and copolymers of 1234ze and VF with at least one additional comonomer that is copolymerizable with 1234ze and VF. Preferably, the additional comonomer(s) is fluoroolefin, preferably containing at least two carbon atoms substituted onto carbon atoms that become part of the main chain of the copolymer. The preferred dipolymer is 1234ze/VF. Preferably, the composition of the dipolymer is 2 to 40 mol % of the 1234ze and 98 to 60 mol % VF to total 100 mol % of the combination of these comonomers. When 1234yf is used in place of 1234ze in the copolymerization with VF, the amount of 1234yf that will copolymerize with the VF is limited, such that the resultant copolymer contains no more than 14 mol % of the 1234yf. Even when an excess amount of 1234yf is present in the copolymerization medium, and measures are taken to facilitate the copolymerization of the 1234yf, the maximum amount that copolymerizes with the VF is 14 mol %. Thus, a preferred 1234ze/VF composition is wherein the 1234ze comprises 15 to 40 mol % and the VF comprises 5 to 60 mol %, to total 100 mol % of the combination of these conomomers.

Another preferred fluoroplastic copolymer of 1234ze with VF is the copolymer comprising 1234ze/VF/TFE. Preferably, the composition of this copolymer is 1 to 25 mol % 1234ze, 20 to 85 mol % VF, and 10 to 80 mol % TFE, to total 100 mol % of the combination of these monomers. Still another preferred copolymer is the copolymer comprising 1234ze/VF/TFE/VF$_2$, wherein the composition is 1 to 25 mol % 1234ze, 20 to 85 mol % VF, and 10 to 80 mol % of the combination of the TFE and VF$_2$, to total 100 mol % of the combination of these monomers. The combination of TFE and VF$_2$ monomers in the copolymer is preferably 10 to 90 mol % of each monomer to total 100 mol % of this combination of these monomers.

Many of these 1234ze/VF copolymers, including terpolymers and quatrapolymers) are soluble in DMF (dimethyl formamide) or DMAC (dimethylacetamide) when heated to 75 to 100° C. The resultant solutions can be cast onto a surface and dried to form either a film that is separable from the surface or a coating on the surface. The film or coating exhibits high resistance to weathering in outdoor exposure. The resultant solution are solvent borne coatings that are useful in the semiconductor industry, the electronic industry, top coats for photoresists, anti-reflective coatings, wire coatings, protective coatings for oil and gas, and photovoltaics.

The copolymers with high TFE content can be melt fabricated by such processes as extrusion and injection molding into films and other shapes that can be used in outdoor environments.

Preferred fluoroplastic copolymers of 1234ze/TFE include dipolymers and copolymers with at least one additional comonomer that is copolymerizable with 1234ze and TFE. Preferably, the additional comonomer(s) is fluoroolefin, preferably containing at least two carbon atoms substituted onto carbon atoms that become part of the main chain of the copolymer. Alternatively, the additional comonomer can be ethylene. The dipolymer resembles the well-known fluoroplastic FEP, which comprises a copolymer of TFE and HFP, except that the 1234ze replaces all of the HFP, and imparts to the resultant 1234ze/TFE copolymer both a faster copolymerization rate and improved thermal stability. The repeat unit —CHCF$_3$—CHF— derived from 1234ze by copolymerization does not give the thermally unstable —CF$_3$CF—CF$_3$CF— diad that arises from head-to-tail coupling of HFP repeat units. U.S. Pat. No. 4,626,587 discloses the thermal instability of this diad. Preferably the composition of the copolymer comprises 1 to 20 mol % 1234ze and 99 to 80 mol % TFE, to total 100 mol % of the combination of these monomers, more preferably 2 to 10 mol % 1234ze and 98 to 90 mol % TFE, to total 100 mol % of the combination of these monomers. In another embodiment, the 1234ze is present in the copolymer in place of only a portion of the HFP, whereby the resultant copolymer comprises 1234ze/TFE/HFP. Both embodiments can be described as the copolymer comprising 1234ze, TFE and optionally, HFP, the combined amount of the 1234ze and the HFP, when present, being from 1 to 20 mol %, and each of the 1234ze and HFP, when present, being in at least the amount of 0.1 mol %, the TFE being present in the amount of 80 to 99 mol %, to total 100 mol % based on the combined mol % of the 1234ze, the TFE and the HFP, when present. More preferably, the copolymer comprises 1234ze, TFE and optionally, HFP, the combined amount of the 1234ze and the HFP, when present, being from 1 to 10 mol %, and each of the 1234ze and HFP, when present, being in at least the amount of 0.1 mol %, the TFE being present in the amount of 90 to 99 mol %, to total 100 mol % based on the combined mol % of the 1234ze, the TFE and the HFP, when present. In a preferred embodiment, the HFP is present in at least the 0.1 mol % amount, preferably at 0.5 mol % amount, up to the maximum amounts of 20 mol % and 10 mol % mentioned above, and more preferably no more than 5 mol %, the 12134ze making up the difference to total the 20 ml % or 10 mol % maximums mentioned above.

The 1234ze/TFE copolymer and the 12324ze/TFE/HFP copolymer can also comprise a small amount of additional fluoromonomer, such as perfluoro(ethyl vinyl ether) or perfluoro(propyl vinyl ether) to improve MIT flex life of the copolymer. Such small amount of fluoroolefin is from 0.2 to 3 wt % of the total weight of the copolymer.

Another embodiment of 1234ze/TFE copolymer is the copolymer comprising 1234ze/TFE/ethylene and optionally HFP or PFBE (perfluorobutyl ethylene, CF$_3$(CF$_2$)$_2$CH═CH$_2$). This embodiment has two aspects. A composition applicable to both of these aspects is 0.1 to 10 mol % 1234ze, 1 to 95 mol % TFE, and 2 to 60 mol % ethylene.

According to one aspect, the 1234ze replaces some or all of the PFBE modifier for ETFE (ethylene/tetrafluoroethylene) copolymer. The modifier is present in a small amount in the ETFE copolymer to improve stress crack resistance. The preferred composition for this aspect is 0.1 to 10 mol % 1234ze, 40 to 60 mol % TFE, and 40 to 60 mol % of the ethylene, based on the combined mol % of the 1234ze, TFE and ethylene totaling 100 mol %. This aspect also contemplates that not all of the PFBE is replaced by the 1234ze, whereby the copolymer is 1234ze/PFBE/TFE/ethylene having the same preferred composition as set forth above, except that the 1234ze and PFBE comprises the 0.1 to 10 mol % portion of the copolymer. Preferably the 1234ze comprises at least 20% of the mols making up this portion and comprises at least 0.1 mol % of the overall copolymer. These copolymers have the same utilities as ETFE copolymer modified with PFBE, such as electrical wire insulation.

According to the other aspect of this embodiment, the 1234ze is present in the copolymer in place of some or all of the HFP in the copolymer TFE/HFP/ethylene. A preferred composition of this copolymer is 2 to 60 mol % 1234ze, 1 to 95 mol % TFE and 2 to 60 mol % ethylene, to total 100 mol % of the combination of these monomers. When HFP is also present in the copolymer, the combination of the 1234ze and HFP totals the 2 to 60 mol %, the amounts of TFE and ethylene being the same as set forth above. The 1234ze and HFP preferably each comprise at least 1% of the 2 to 60 mol %, and more preferably at least 2% of the total mol % of the 1234ze and HFP combined, with the proviso that the copolymer comprises at least 12 mol % of the 1234ze, preferably at least 3 mol % of the 1234ze, based on the combined mol % of the 1234ze, the TFE, the HFP, and the ethylene totaling 100 mol %. Another preferred composition of the copolymer is 2 to 25 mol % 1234ze, 60 to 95 mol % TFE, and 2 to 25 mol % ethylene, to total 100 mol % of the combination of these monomers. When HFP is also present in the copolymer, the combination of the 1234ze and HFP totals the 2 to 25 mol %, the amounts of TFE and ethylene being the same as set forth above for this preferred composition. The 1234ze and HFP preferably each comprise at least 1% of the 2 to 25 mol %, and more preferably at least 2% of the total mol % of the 1234ze and HFP combined, with the proviso that the copolymer comprises at least 2 mol % of the 1234ze, preferably at least 3 mol % of the 1234ze, based on the combined mol % of the 1234ze, the TFE, the HFP, and the ethylene totaling 100 mol %. The 1234ze/TFE/ethylene and 1234ze/TFE/HFP/ethylene copolymers of the present invention are preferably amorphous, i.e. have no to low crystallinity such that they can be melt fabricated into transparent films. They also have low dielectric constant, making the films useful as insulation in the electronics applications.

The 1234ze/TFE copolymers are insoluble in hydrocarbon solvents, even at elevated temperature, but are melt fabricable by such molding techniques as extrusion and injection molding into such shapes as film and tubes for utility in the same way as FEP.

Another embodiment of preferred fluoroplastic copolymers is the copolymer wherein 1234ze replaces some or all of the HFIB (hexafluoroisobutylene) stress crack modifier of the ECTFE (ethylene/chlorotrifluoroethylene) copolymer. A preferred composition of this copolymer comprises 40 to 60 mol % ethylene, 40 to 60 mol % of either CTFE or CTFE and TFE, and 0.1 to 10 mol % of 1234ze, based on the combined mol % totaling 100 mol %. The CTFE component may constitute the entire 40 to 60 mol % or up to 80% of the mols of CTFE and TFE making up this 40 to 60 mol % component of the copolymer. Thus, this copolymer can be 1234ze/CTFE/ethylene or 1234ze/CTFE/TFE/ethylene. Any of these copolymers can also comprise HFIB in place of part of the 0.1 to 10 mol % 1234ze component. For example, the HFIB can replace at least 20% of the mols of 1234ze component, with the proviso that the minimum content of the 1234ze in the copolymer is at least 0.1 mol %, preferably at least 0.5 mol %. Thus, the copolymer of this embodiment in which the presence of TFE and HFIB in the copolymer are both optional independent of one another contemplates 1234ze/CTFE/ethylene/HFIB and 1234ze/CTFE/TFE/ethylene/HFIB copolymers as well as these copolymers without either the TFE or the HFIB. The copolymers of this embodiment of the present invention are useful as a corrosion-resistant coating on corrosion susceptible substrates.

Preferred fluoroplastic copolymers of 1234ze/VF$_2$ include dipolymers and copolymers with at least one additional comonomer that is copolymerizable with 1234ze and VF$_2$.

Preferably, the additional comonomer(s) is fluoroolefin, preferably containing at least two carbon atoms substituted onto carbon atoms that become part of the main chain of the copolymer. Preferably, the composition of the dipolymer is 2 to 35 mol % of the 1234ze and 98 to 65 mol % $VF_2$ to total 100 mol % of the combination of these comonomers. Preferably the copolymer comprises 1234ze, TFE, $VF_2$ and optionally HFP. The 1234ze can be present in the copolymer in place of part or all of the HFP found in TFE/$VF_2$/HFP copolymer. The preferred composition of the copolymer 1234ze/$VF_2$/TFE is 2 to 20 mol % 1234ze, 15 to 50 mol % $VF_2$, and 20 to 80 mol % TFE, to total 100 mol % of the combination of these monomers. The preferred composition of the copolymer 1234ze/$VF_2$/TFE/HFP is the same as for the 1234ze/$VF_2$/TFE copolymer, except that the 2 to 20 mol % of the 1234ze is applicable to the combination of the 1234ze and the HFP. With respect to this 1234ze/HFP combination, the amount of 1234ze present is 10 to 90 mol %, and the amount of HFP present is 90 to 10 mol %, total 100 mol % of the combination of monomers. These copolymers are melt fabricable by such molding techniques as extrusion and injection molding into such shapes as film for coating or tubes for conveying fluids.

With Respect to Fluoroelastomers:

Preferred fluoroelastomers are copolymers comprising 1234ze/$VF_2$ and exhibiting a Tg of no greater than 5° C. and preferably no greater than 0° C. The 1234ze comonomer represents a site for curing of the fluoro-elastomer. The dipolymer 1234ze/$VF_2$ preferably has the composition of 5 to 35 mol % 1234ze and 95 to 65 mol % $VF_2$, to total 100 mol % of the combination of these monomers. Preferred copolymers of 1234ze/$VF_2$ comprise at least one additional monomer that is copolymerizable with 1234ze and $VF_2$. Preferably, the additional comonomer(s) is fluoroolefin, preferably containing at least two carbon atoms substituted onto carbon atoms that become part of the main chain of the copolymer. Preferred additional monomers are one or more of HFP, TFE, and PMVE.

A preferred fluoroelastomer comprises 1234ze/$VF_2$/HFP having the following composition: (1234ze+HFP)/$VF_2$=(30 to 15)/70 to 85 mol % to total 100 mol % (same meaning as to total 100 mol % of the combination of these monomers). Preferably, the 1234ze comprises 5 to 95% and the HFP comprises 95 to 5% to total 100% of the 30 to 15 mol %, more preferably 10 to 90% of the 1234ze and 90 to 10% of the HFP to total 100% of the 30 to 15 mol %.

Another preferred fluoroelastomer comprises 1234ze/$VF_2$/TFE having the following composition: 1234ze/$VF_2$/TFE=15 to 25/50 to 80/7 to 30 mol % to total 100 mol %.

Another preferred fluoroelastomer comprises 1234ze/$VF_2$/TFE/HFP having the following composition: (1234ze+HFP)/$VF_2$/TFE=(15 to 25)/50 to 80/7 to 30 mol % to total 100 ml %. Preferably, the 1234ze comprises 5 to 95% and the HFP comprises 95 to 5% to total 100% of the 15 to 25 mol %, more preferably 10 to 90% of the 1234ze and 90 to 10% of the HFP to total 100% of the 15 to 25 mol %.

Another preferred fluoroelastomer comprises 1234ze/$VF_2$/TFE/PMVE having the following composition: 1 to 40 mol % 1234ze, 15 to 60 mol % $VF_2$, 5 to 25 mol % TFE, and 15 to 40 mol % PMVE, to total 100 mol % of the combination of these monomers.

Another preferred elastomer also having a Tg of no greater than 5° C., preferably no greater than 0° C. comprises 1234ze/TFE/PMVE preferably having the composition 0.1 to 5/55 to 65/35 to 45 mol % to total 100 mol %

The as-copolymerized fluoroelastomer is typically a gum that can be incorporated such as by compounding with additional ingredients as desired and then cured to exhibit the rubbery character. The curing is carried out by incorporating curing agent, preferably that which is nucleophilic for crosslinking reaction with the 1234ze monomer present in the copolymer, into the copolymer and heating the resultant copolymer/curing agent mixture. Prior to heating, the compounded copolymer is formed into the desired shape of the article to be cured.

Such additional ingredients for compounding into the copolymer include particulate filler such as barium sulfate or titanium dioxide, acid acceptor such as metal oxide, such as magnesium oxide or calcium hydroxide, curing agent such as ethylenediamine carbamate, hexamethylene diamine carbamate, triethylenetetramine/benzoyl peroxide, and N,N'-m-phenylene dimaleimide. Additional curing agent is disclosed in Example 23 below. The compounded copolymer can then be formed by conventional hot processing into such shapes as seals, gaskets, o-rings, and hoses, followed by post-curing at elevated temperatures such as 450° F. (232° C.).

The copolymerization process to prepare 1234ze copolymers of the present invention is preferably conducted, as in the Examples below, to produce random copolymers, i.e. without programming the monomer feed into the polymerization reaction to produce block copolymer.

A typical large scale process for the copolymerization to form 1234ze copolymers of the present invention is aqueous dispersion polymerization of the monomers in a stirred heated reactor containing a fluorosurfactant, free radical initiator, and deionized water. As the polymerization proceeds, additional monomers are added to maintain the pressure, along with additional feeds of surfactant and initiator. A chain transfer agent may be employed in the copolymerization of some polymers to control molecular weight. To terminate the copolymerization, all the feeds are stopped, the reactor is vented and purged with nitrogen, and the raw copolymer dispersion in the reactor is transferred to a cooling vessel. For use in coatings for metals, glass and fabric, the polymer dispersion is typically transferred to a dispersion concentration operation which produces stabilized dispersions used as coatings. Alternatively, the copolymer dispersion is coagulated, and the coagulated copolymer is separated from the aqueous medium and is dried to obtain copolymer powder, which can then be used to fabricate articles such as by melt-processing in the case of fluoroplastics or press fabrication, followed by post-curing in the case of fluoroelastomers

EXAMPLES

Thermal Stability Test—In this Test, the thermal stability of the copolymer is determined by heating up a sample of the copolymer, during which time, the % wt loss is measured. The higher the temperature before the % wt loss reaches 5 wt %, the greater the thermal stability of the copolymer. The Thermal Stability Test is conducted using a Q50 TGA (thermo gravimetric analyzer) instrument by TA Instruments. The test is run under air from room temperature to 500° C. by heating a copolymer sample (10 to 15 milligrams) at the rate of 10° C./minute. The weight loss of the sample is monitored and recorded. From this recording, the temperature at which the weight loss reaches 5 wt % can be calculated.

Examples 1 to 8—VF/TFE/1234ze Copolymer

A 400 mL Hastelloy® C shaker tube is charged with distilled water (200 mL), Capstone® FS-10 (5.30 g), disodium hydrogen phosphate (1.3 g) and ammonium persulfate (0.16 g), cooled, evacuated and nitrogen flushed. Vinyl fluoride (3.125 g), tetrafluoroethylene (50 g) and 1, 3,3,3-tetrafluoropropene (9.4 g) is then charged to the shaker tube. Vigorous shaking of the shaker tube is started and continued throughout the run. The shaker tube is heated to 70° C. causing the pressure in the autoclave to increase from 260 to 645 psi (1.8 to 4.5 MPa). Shaking and heating were stopped 18 minutes later after pressure had decreased 21% to 513 psi (3.5 MPa). This gives a polymer emulsion that is coagulated by adding 100 ml of saturated aqueous MgSO4 with vigorous stirring. The precipitated polymer is collected by filtration and washed several times with warm water (70° C.). After drying in vacuum oven (100 mmHg) at 80° C. for 24 hours, 28 g of white polymer are obtained.

Polymer Analysis:
DSC, 10° C./min, $N_2$, second heat: Tm at 199° C. and Tm at 288° C. Composition $^{19}$F NMR (mol %): VF/TFE/1,3,3,3-tetrafluoropropene terpolymer (15.74/78.4/5.86). Copolymerization in a reactor to which the monomers are fed to the reactor during copolymerization yields a copolymer having a single melting temperature (Tm).

The same experimental procedure is applied to Example 2 to 8, and the results are listed in Table 1.

reaction time (time for pressure drop) for all of the copolymers of Examples 1 to 8 is short, indicating the high reactivity of 1234ze in copolymerization. The copolymers are insoluble in hydrocarbon solvents at ambient temperature (about 20° C.) temperature, but are soluble in DMF and DMAC heated to temperatures of 75 to ° C.

Examples 9 to 12—HFP-TFE-1234ze Copolymer

A 400 mL Hastelloy® C shaker tube is charged with distilled water (200 mL), Capstone® FS-10 (5.30 g), disodium hydrogen phosphate (1.3 g) and ammonium persulfate (0.16 g), cooled, evacuated and nitrogen flushed. Hexafluoropropylene (3.5 g), tetrafluoroethylene (50 g) and 1,3,3,3-tetrafluoropropene (17 g) are then charged to the shaker tube. Vigorous shaking of the shaker tube is started and continued throughout the run. The shaker tube is heated to 70° C. causing the pressure in the autoclave to increase from 192 to 572 psi (1.3 to 3.9 MPa). Shaking and heating are stopped 33 minutes later after pressure has decreased 21% to 458 psi (3.2 MPa). This gives a polymer emulsion that is coagulated by adding 100 ml of saturated aqueous MgSO4 with vigorous stirring. The precipitated polymer is collected by filtration and washed several times with warm water (70° C.). After drying in vacuum oven (100 mmHg) at 80° C. for 24 hours, 24.1 g of white polymer are obtained.

TABLE 1

| VF-TFE-1,3,3,3-tetrafluoropropene Terpolymer | | | | | | | | | |
|---|---|---|---|---|---|---|---|---|---|
| Example # | | 1 | 2 | 3 | 4 | 5 | 6 | 7 | 8 |
| Material charge | | | | | | | | | |
| DI water | g | 200 | 200 | 200 | 220 | 180 | 180 | 180 | 180 |
| APS | g | 0.16 | 0.16 | 0.16 | 0.16 | 0.16 | 0.16 | 0.16 | 0.16 |
| Na$_2$HPO4.7H$_2$O | g | 1.30 | 1.30 | 1.30 | 1.30 | 1.3 | 1.3 | 1.3 | 1.3 |
| FS-10 | g | 5.30 | 5.30 | 5.30 | 5.30 | 5.3 | 5.3 | 5.3 | 5.3 |
| VF | g | 3.13 | 8.30 | 15 | 20 | 9 | 20 | 34 | 60 |
| TFE | g | 50 | 50 | 40 | 20 | 50 | 40 | 30 | 20 |
| CF$_3$CH=CHF | g | 9.4 | 17 | 45 | 60 | 3.125 | 6.7 | 11.25 | 20 |
| Reaction condition | | | | | | | | | |
| Temp | ° C. | 70 | 71.9 | 71.9 | 70 | 68 | 68.4 | 70 | 71.4 |
| Init Pressure | MPa | 4.5 | 4.8 | 4.7 | 4.1 | 4.8 | 4.9 | 5.4 | 6.1 |
| Final Pressure | MPa | 3.5 | 3.8 | 3.8 | 3.3 | 3.9 | 3.9 | 4.3 | 4.7 |
| time for P drop | min | 18 | 17 | 13 | 21 | 5 | 11 | 9 | 22 |
| Product | | | | | | | | | |
| Polymer | g | 28 | 16.2 | 28.7 | 26 | 19.5 | 24 | 27 | 30 |
| Thermal data | | | | | | | | | |
| Tg | ° C. | | (−13.3), (39.3) | (−13.9), (37.8) | 37.13 | | | 45.6 | 41.7 |
| Tm | ° C. | (199) (288), | 173.35 | 134.7 | N/A | 197 | 180.7 | 168.3 | 151.1 |
| 5 wt % loss of Polymer in air | ° C. | 348.75 | 321.87 | 328.52 | 354.46 | 304 | 325.69 | 302 | 297 |
| Polymer composition by $^{19}$F NMR | | | | | | | | | |
| VF | mol % | 20.77 | 40.66 | 48.05 | 52.96 | 46.87 | 60.69 | 77.72 | 82.41 |
| TFE | mol % | 76.82 | 55.04 | 44.29 | 28.56 | 52.24 | 36.56 | 19.22 | 12.02 |
| CF$_3$CH=CHF | mol % | 2.4 | 4.3 | 7.65 | 18.48 | 0.89 | 2.75 | 3.06 | 5.56 |

The copolymer of Example 4 exhibits the highest thermal stability, arising from this copolymer containing the highest amount of 1234ze, notwithstanding that this copolymer contains a substantial amount of VF and relatively small amount of TFE. The copolymer of Example 4 has no melting temperature, indicating the absence of crystallinity. The Polymer Analysis:
DSC, 10° C./min, N2, second heat: Tm at 289° C.
Composition $^{19}$F NMR (mol %): HFP/TFE/1,3,3,3-tetrafluoropropene terpolymer (0.5/95.66/3.84)
The same experimental procedure is applied to Example 10 to 12 and the results are listed in Table 2.

TABLE 2

| HFP-TFE-1,3,3,3-tetrafluoropropene Terpolymer | | | | | |
|---|---|---|---|---|---|
| Example # | | 9 | 10 | 11 | 12 |
| Material charge | | | | | |
| DI water | g | 180 | 200 | 200 | 200 |
| APS | g | 0.16 | 0.16 | 0.16 | 0.16 |
| Na$_2$HPO$_4$.7H$_2$O | g | 1.30 | 1.30 | 1.30 | 1.30 |
| FS-10 | g | 5.30 | 5.30 | 5.30 | 5.30 |
| HFP | g | 3.50 | 17.00 | 40 | 60 |
| TFE | g | 50 | 50 | 45 | 30 |
| CF$_3$CH=CHF | g | 17 | 17 | 15 | 10 |
| Reaction condition | | | | | |
| temp | °C. | 70 | 72 | 71 | 71 |
| Init Pressure | MPa | 3.9 | 4.1 | 4.0 | 4.0 |
| Final Pressure | MPa | 3.2 | 3.3 | 3.2 | 2.7 |
| time for Pressure drop | min | 33 | 43 | 73 | 163 |
| Product | | | | | |
| polymer | g | 24.1 | 26 | 34 | 24 |
| Thermal data | | | | | |
| Tm | °C. | 289 | 284 | 280 | 276 |
| 5 wt % loss of Polymer | °C. | 463 | 432 | 424 | 412 |
| Polymer composition by $^{19}$F NMR | | | | | |
| HFP | mol % | 0.5 | 1.11 | 2.29 | 4.54 |
| TFE | mol % | 95.66 | 95.4 | 94.35 | 92.36 |
| CF$_3$CH=CHF | mol % | 3.84 | 3.49 | 3.36 | 3.1 |

HFP-TFE-1,3,3,3-tetrafluoropropene terpolymer (Table 2) data demonstrates 1,3,3,3-tetrafluoropropene reacts faster with TFE than does HFP. This is indicated by the increase in time for pressure drop (reaction time) as the HFP content increases, with relatively small change in 1234ze content. The 5% polymer weight loss in air indicates that the terpolymer is more thermally stable as 1,3,3,3-tetrafluoropropene content increases. The polymer composition of Example 9, having the highest 1234ze content, exhibits the highest temperature reached before weight loss reaches 5 wt %. The copolymers of Examples 9 to 12 are all insoluble in hydrocarbon solvents, including DMF and DMAC heated to temperatures of 75 to 100° C.

Examples 13 to 18—VF-1234ze Copolymer

A 400 mL Hastelloy C shaker tube was charged with distilled water (200 mL), Pluronic® 31R1 (0.1 g) and Vazo-50 (0.05 g), cooled, evacuated and nitrogen flushed. Vinyl fluoride (90 g) and 1,3,3,3-tetrafluoropropene (10 g) are then charged to the shaker tube. Vigorous shaking of the shaker tube is started and continued throughout the run. The shaker tube is heated to 80° C. causing the pressure in the autoclave to increase from 168 to 1240 psi (1.2 to 8.6 MPa). Shaking and heating are stopped 33 minutes later after pressure has decreased 20% to 981 psi (6.9 MPa). This gives a polymer emulsion that is coagulated by adding 100 ml of saturated aqueous MgSO4 with vigorous stirring. The precipitated polymer is collected by filtration and washed several times with warm water (70° C.). After drying in vacuum oven (100 mmHg) at 80° C. for 24 hours, 47 g of white polymer are obtained.

Polymer Analysis:
DSC, 10° C./min, N$_2$, second heat: Tg at 44° C. and Tm at 179° C.
Composition $^{19}$F NMR (mol %): VF/1,3,3,3-tetrafluoropropene copolymer (97.9/2.1).

The same experimental procedure is applied to Example 14 to 18, and the results are listed in Table 3.

TABLE 3

| VF-1,3,3,3-tetrafluoropropene Copolymer | | | | | | | |
|---|---|---|---|---|---|---|---|
| Example # | | 13 | 14 | 15 | 16 | 17 | 18 |
| Material charge | | | | | | | |
| DI water | g | 200 | 200 | 200 | 200 | 200 | 200 |
| V-50 | g | 0.05 | 0.05 | 0.05 | 0.05 | 0.05 | 0.05 |
| VF | g | 90 | 75 | 50 | 25 | 70 | 65 |
| CF$_3$CH=CHF | g | 10 | 25 | 50 | 75 | 30 | 35 |
| 31R1 | g | 0.1 | 0.1 | 0.1 | 0.1 | 0.1 | 0.1 |
| Reaction condition | | | | | | | |
| Temp | °C. | 80 | 80 | 80.2 | 80.5 | 80.8 | 81.3 |
| Init. Pressure | MPa | 8.3 | 8.1 | 5.5 | 3.9 | 7.1 | 6.4 |
| Final Pressure | MPa | 6.8 | 6.5 | 4.4 | 3.7 | 5.5 | 5.1 |
| time for Pressure drop | min | 32 | 50 | 100 | 420 | 51 | 52 |
| Product | | | | | | | |
| Polymer | g | 47 | 39 | 40 | 10 | 46 | 48 |
| Thermal data | | | | | | | |
| Tg | °C. | 44 | 38 | 38 | 46 | 36 | 36 |
| Tm | °C. | 179 | 154 | N/A | N/A | 139 | N/A |
| 5 wt % loss of Polymer | °C. | 300 | 303 | 313 | 327 | 316 | 298 |
| Polymer composition by $^{19}$F NMR | | | | | | | |
| CH$_2$=CHF | mol % | 97.9 | 93.59 | 81.01 | 69.96 | 91.76 | 89.37 |
| CF$_3$CH=CHF | mol % | 2.1 | 6.41 | 18.99 | 30.04 | 8.24 | 10.63 |

The copolymers are all insoluble in hydrocarbon solvents at ambient temperature, but are soluble in DMF and DMAC heated to 75 to 100° C.

The same series of experiments are run with VF-2,3,3,3-tetrafluoropropene (HFO-1234yf) under the same conditions. The 2,3,3,3-tetrafluoropropene incorporation levels off at 13 to 16 mol %. Greater amounts of 1234yf added to the reactor does not result in an increase in 1234yf incorporation greater than 16 mol % in the copolymer. This maximum incorporation of 1234yf into the copolymer does not increase with changes made to the copolymerization process in attempts to increase this maximum incorporation amount, including extending the reaction time and increasing the 1234yf monomer feed.

Examples 19 to 22—TFE-1234ze Copolymer

A 400 mL Hastelloy C shaker tube is charged with distilled water (180 mL), Capstone® FS-10 (5.30 g), disodium hydrogen phosphate (1.3 g) and ammonium persulfate (0.16 g), cooled, evacuated and nitrogen flushed. Tetrafluoroethylene (45 g) and 1,3,3,3-tetrafluoropropene (5 g) are then charged to the shaker tube. Vigorous shaking of the shaker tube is started and continued throughout the run. The shaker tube is heated to 70° C. causing the pressure in the autoclave to increase from 156 to 543 psi (1.1 to 3.7 MPa). Shaking and heating are stopped 33 minutes later after pressure has decreased 20% to 434 psi (3.0 MPa). This gives a polymer emulsion that is coagulated by adding 100 ml of saturated aqueous MgSO4 with vigorous stirring. The precipitated polymer is collected by filtration and washed several times with warm water (70° C.). After drying in vacuum oven (100 mmHg) at 80° C. for 24 hours, 18 g of white polymer are obtained.

Polymer Analysis:

DSC, 10° C./min, $N_2$, second heat: Tm at 306.5° C.

Composition $^{19}F$ NMR (mol %): TFE/1,3,3,3-tetrafluoropropene copolymer (98/2)

The same experimental procedure was applied to Example 20 to 22, and the results are listed in Table 4.

TABLE 4

TFE-1,3,3,3-tetrafluoropropene Copolymer

| Example # | | 19 | 20 | 21 | 22 |
|---|---|---|---|---|---|
| Material charge | | | | | |
| DI water | g | 180 | 180 | 180 | 180 |
| APS | g | 0.16 | 0.16 | 0.16 | 0.16 |
| Na2HPO4.7H2O | g | 1.30 | 1.30 | 1.30 | 1.30 |
| FS-10 | g | 5.30 | 5.30 | 5.30 | 5.30 |
| TFE | g | 45 | 50 | 50 | 25 |
| CF3CH=CHF | g | 5 | 17 | 50 | 75 |
| Reaction condition | | | | | |
| Temp | ° C. | 69.8 | 70.5 | 70.4 | 70.7 |
| Init Pressure | MPa | 3.7 | 4.2 | 3.8 | 2.8 |
| Final Pressure | MPa | 3.0 | 3.4 | 3.1 | 2.4 |
| time for Pressure drop | min | 14 | 31 | 140 | 442 |
| Product | | | | | |
| Polymer | g | 18 | 25 | 19 | 9 |
| Thermal data | | | | | |
| Tm | ° C. | 306.5 | 289.7 | 260.4 | 207.47 |
| 5 wt % loss of Polymer | ° C. | 434.34 | 437.15 | 402.01 | 370.6 |
| Polymer composition by $^{19}F$ NMR | | | | | |
| TFE | mol % | 98 | 96.3 | 92.17 | 86.6 |
| CF3CH=CHF | mol % | 2 | 3.7 | 7.83 | 13.4 |

The polymerizations Examples 19 to 22 above are repeated, except that the 1234ze is replaced by HFP to demonstrate the faster copolymerization when 1234ze is used instead of HFP. The results are shown in Table 5.

TABLE 5

TFE-HFP Copolymer

| Comparative Examples | | 1 | 2 | 3 | 4 |
|---|---|---|---|---|---|
| Material charge | | | | | |
| DI water | g | 180 | 180 | 180 | 180 |
| APS | g | 0.16 | 0.16 | 0.16 | 0.16 |
| Na2HPO4.7H2O | g | 1.3 | 1.3 | 1.3 | 1.3 |
| FS-10 | g | 5.3 | 5.3 | 5.3 | 5.3 |
| TFE | g | 50 | 45 | 25 | 10 |
| CF3CF=CF2 | g | 17 | 45 | 75 | 90 |
| Reaction condition | | | | | |
| Temp | ° C. | 60.3 | 70 | 70 | 72.5 |
| Init Pressure | MPa | 3.9 | 3.7 | 3.0 | 2.6 |
| Final Pressure | MPa | 3.2 | 3.0 | 2.4 | 2.4 |
| time for Pressure drop | min | 15 | 21 | 88 | 104 |
| Product | | | | | |
| Polymer | g | 25.36 | 24.19 | 25.01 | 11.55 |
| Thermal data | | | | | |
| Tm | ° C. | 311.7 | 298.9 | 287.7 | 228.4 |
| 5 wt % loss of Polymer | ° C. | 422.99 | 426.81 | 396.46 | 379.8 |
| Polymer composition by $^{19}F$ NMR | | | | | |
| TFE | mol % | 97.84 | 95.66 | 90.37 | 84.79 |
| CF3CF=CF2 | mol % | 2.16 | 4.34 | 9.63 | 15.21 |

The copolymers of Examples 19 to 22 are all insoluble in hydrocarbon solvents, including DMF and DMAC heated to 75 to 100° C.

Comparing TFE-1,3,3,3-tetrafluoropropene copolymer (Table 4) with TFE-HFP copolymer (Table 5), TFE/1,3,3,3-tetrafluoropropene copolymer has better incorporation with TFE than HFP based on NMR data. The copolymerizations carried out using HFP require a much greater proportion of HFP feed into the reactor than when 1234ze is used. The copolymer of TFE-1,3,3,3-tetrafluoropropene is thermally more stable than TFE-HFP copolymer by the higher 5 wt % loss temperatures for the 1234ze-containing copolymer at least for compositions containing up to 8 or 10 mol % 1234ze.

Example 23—fluoroelastomer of 1234ze/$VF_2$/TFE/PMVE Copolymer

This fluoroelastomer is prepared by a semi-batch emulsion polymerization process, carried out at 80° C. in a well-stirred reaction vessel. A water solution is prepared by dissolving 1.75 g sodium phosphate dibasic heptahydrate and 0.42 g of sodium octyl sulfonate to 1350 g with deionized, deoxygenated water. From this solution, 1250 g is charged to a 2-liter reactor. The solution is heated to 80° C. After removal of trace oxygen, the reactor is pressurized to 320 psig (2.2 MPa) with a monomer mixture of 35.9 wt % vinylidine fluoride ($VF_2$), 8.3 wt % HFO-1234ze, 50.8 wt % perfluoro(methyl vinyl ether) (PMVE), and 5.0 wt % tetrafluoroethylene (TFE). A 40 ml sample of a 4.0 wt % ammonium persulfate and 9.6 wt. % sodium phosphate dibasic heptahydrate initiator aqueous solution is then added. As the reactor pressure drops, a monomer mixture of 49.3 wt % $VF_2$, 3.1 wt % HFO1234ze, 39.4 wt % PMVE and 12.2 wt % TFE is supplied to the reactor to maintain a pressure of 320 psig (2.2 MPa) throughout the polymerization. Additional initiator solution is added to maintain polymerization rate. After a total of 417 g incremental monomer had been fed, monomer addition is discontinued and the reactor is purged of residual monomer. The total reaction time is 2.2 hours. The resulting fluoroelastomer latex has a solids content of 25.4 wt % and a pH of 6.0. The fluoroelastomer latex is coagulated with aluminum potassium sulfate solution, washed with deionized water, and dried. The copolymer has a Tg of −24.1 C and a composition (NMR $^1$H and $^{19}$F) in mol % of VF$_2$/TFE/1234ze/PMVE=48.9/24.3/24.1/2.7.

The copolymer is compounded, molded into O-rings press and post-cured, followed by compression set testing to demonstrate the function of the 1234ze comonomer in the copolymer as a cure site in the curing process. The cured O-rings exhibit elastomer behavior by being rubbery and by resistance to compression setting.

The copolymer is compounded on a two-roll rubber mill in the proportions (parts by weights) shown in Table 6. Cure characteristics of the compounded compositions are shown in Table 7.

O-rings are made by press curing at 177° C., followed by a post cure under nitrogen at 232° C. for 16 hours.

TABLE 6

Compounded Compositions

| Batch No. | A | B |
|---|---|---|
| | Recipe in phr | |
| Amount of Copolymer | 96.70 | 100.00 |
| MT Black | 30.00 | 30.00 |
| RCR-6190 | 2.00 | 0.00 |
| VC-50 | 1.30 | 2.00 |
| bisphenol-AF | 0.00 | 0.40 |
| Calcium Hydroxide HP-XL | 6.00 | 6.00 |
| magnesium oxide | 3.00 | 3.00 |
| Total | 139.00 | 141.40 |
| Batch Size | 139.00 | 141.40 |

RCR 6190 is a mixture of benzyltriphenylphosphonium chloride (34.4 wt %) and bis(phenol)-AF (65.6 wt %). VC-50 is a mixture of 4,4'-[2,2,2-trifluoro-1-(trifluoromethyl-ethylidene]diphenol (about 62 wt %) and benzyltriphenylphosphonium-4,4-[trifluoro-1-trifluoromethyl)ethylidene] diphenol salt (1:1)(about 38 wt %)

Cure characteristics are initially measured using a Monsanto MDR 2000 instrument under the following conditions:

Moving die frequency: 1.66 Hz;

Oscillation amplitude: ±0.5 degrees

Temperature: 165 or 177° C.

Duration of test: 30 minutes

Tc90: time to 90% of maximum torque, minutes

Compression set of O-ring samples was determined in accordance with ASTM D395-89, 25% deflection for 70 hours at 200° C., 168 hours at 200° C., and 70 hours at 225° C. Mean values are reported in Table 7.

TABLE 7

Compression Set (C/S) Test Results

| Batch number | (A) | (B) |
|---|---|---|
| | Compression Set Test | |
| Hot Air-70 hr @ 200° C. | | |
| Avg C/S [%] | 56.86 | 39.71 |
| Median C/S [%] | 55.88 | 39.71 |
| Hot Air-70 hr @ 225° C. | | |
| Avg C/S [%] | 85.71 | 80.88 |
| Median C/S [%] | 85.71 | 80.88 |

TABLE 7-continued

Compression Set (C/S) Test Results

| Batch number | (A) | (B) |
|---|---|---|
| | Compression Set Test | |
| Hot Air-168 hr @ 200° C. | | |
| Avg C/S [%] | 74.51 | 66.18 |
| Median C/S [%] | 73.53 | 66.18 |

The above test results reveal fluoroelastomer exhibits good elastomer properties arising from the adequate cross-linking density of the cure. The foregoing described procedure for curing, including compounding and molding, is applicable to the fluoroelastomer copolymers of the present invention.

Example 24—Fluoroelastomer of 1234ze/VF$_2$/PMVE/TFE Copolymer

This fluoroelastomer is prepared by a semi-batch emulsion polymerization process, carried out at 80° C. in a well-stirred reaction vessel. A water solution is prepared by dissolving 1.75 sodium phosphate dibasic heptahydrate and 0.42 g of sodium octyl sulfonate to 1350 g with deionized, deoxygenated water. From this solution, 1250 is charged to a 2-liter reactor. The solution is heated to 80° C. After removal of trace oxygen, the reactor is pressurized to 320 psig (2.2 MPa) with a monomer mixture of 8.1 wt % vinylidine fluoride (VF$_2$), 44.4 wt % HFO1234ze, 44.7 wt % perfluoro methyl vinyl ether (PMVE), and 2.8 wt % tetrafluoroethylene (TFE). A 40 ml sample of a 4.0 wt % ammonium persulfate and 9.6 wt % sodium phosphate dibasic heptahydrate initiator aqueous solution is then added. As the reactor pressure drops, a monomer mixture of 18.9 wt % VF$_2$, 34.2 wt % HFO-1234ze, 36.8 wt % PMVE and 10.1 wt % TFE is supplied to the reactor to maintain a pressure of 320 psig (2.2 MPa throughout the polymerization. Additional initiator solution is added to maintain polymerization rate. After a total of 417 g incremental monomer has been fed, monomer addition is discontinued and the reactor is purged of residual monomer. The total reaction time is 13 hours. The resulting fluoroelastomer latex has a solids content of 6.0 wt % and a pH of 3.3. The fluoroelastomer latex is coagulated with aluminum potassium sulfate solution, washed with deionized water, and dried. The copolymer has a Tg of less than 0° C. and a composition (NMR $^1$H and $^{19}$F) in mol % of VF$_2$/TFE/1234ze/PMVE=33.2/12.9/37.9/16.0.

Examples 25 to 28—1234ze/TFE/VF$_2$ Copolymer

A 400 mL Hastelloy C shaker tube is charged with distilled water (220 mL), Capstone® FS-10 (5.30 g), disodium hydrogen phosphate (1.3 g) and ammonium persulfate (0.16 g), cooled, evacuated and nitrogen flushed. Vinylidene fluoride (3.125 g), tetrafluoroethylene (50 g) and 1,3,3,3-tetrafluoropropene (9.4 g) are then charged to the shaker tube. Vigorous shaking of the shaker tube is started and continued throughout the run. The shaker tube is heated to 70° C. causing the pressure in the autoclave to increase from 260 to 600 psi (1.8 to 4.1 MPa). Shaking and heating are stopped 30 minutes later after pressure has decreased 20% to 480 psi (3.3 MPa). This gives a polymer emulsion that is coagulated by adding 100 ml of saturated aqueous MgSO4 with vigorous stirring. The precipitated polymer is collected by filtration and washed several times with warm water (70° C.). After drying in vacuum oven (100 mmHg) at 80° C. for 24 hours, 30 g of white polymer are obtained.
Polymer Analysis:
DSC, 10° C./min, $N_2$, second heat: Tm at 180° C.
Composition $^{19}F$ NMR (mol %): $VF_2$/TFE/1,3,3,3-tetrafluoropropene terpolymer (18/80/2)

The same experimental procedure is applied to Example 26 to 28 and the results are listed in Table 8.

TABLE 8

TFE-1,3,3,3 tetrafluoropropene-$VF_2$ Terpolymer

| Example # | | 25 | 26 | 27 | 28 |
|---|---|---|---|---|---|
| Material charge | | | | | |
| DI water | g | 220 | 220 | 220 | 220 |
| APS | g | 0.16 | 0.16 | 0.16 | 0.16 |
| $Na_2HPO_4.7H_2O$ | g | 1.30 | 1.30 | 1.30 | 1.30 |
| FS-10 | g | 5.30 | 5.30 | 5.30 | 5.30 |
| $VF_2$ | g | 3.13 | 8.30 | 15 | 20 |
| TFE | g | 50 | 50 | 40 | 20 |
| $CF_3CH{=}CHF$ | g | 9.4 | 17 | 45 | 60 |
| Reaction condition | | | | | |
| Temp | ° C. | 70 | 70 | 70 | 70 |
| Init Pressure | MPa | 4.1 | 3.9 | 3.5 | 2.8 |
| Final Pressure | MPa | 3.3 | 3.1 | 2.8 | 2.2 |
| time for P drop | min | 30 | 30 | 45 | 60 |
| Product | | | | | |
| Polymer | g | 30 | 25 | 20 | 25 |
| Thermal data | | | | | |
| Tm | ° C. | 262 | 210 | 144 | 73 |
| 5 wt % loss of Polymer in air | ° C. | 389 | 362 | 350 | 344 |
| Polymer composition by $^{19}F$ NMR | | | | | |
| $VF_2$ | mol % | 18 | 38 | 48 | 50 |
| TFE | mol % | 80 | 58 | 44 | 22 |
| $CF_3CH{=}CHF$ | mol % | 2 | 4 | 8 | 18 |

The copolymers are insoluble in hydrocarbon solvents, including DMF and DMAC heated to 75 to 100° C.

Examples 29 to 32—1234ze/TFE/ethylene Copolymer

A 400 mL Hastelloy C shaker tube is charged with distilled water (220 mL), Capstone® FS-10 (5.30 g), disodium hydrogen phosphate (1.3 g) and ammonium persulfate (0.16 g), cooled, evacuated and nitrogen flushed. Ethylene (3.125 g), tetrafluoroethylene (50 g) and 1,3,3,3-tetrafluoropropene (9.4 g) are then charged to the shaker tube. Vigorous shaking of the shaker tube is started and continued throughout the run. The shaker tube is heated to 70° C. causing the pressure in the autoclave to increase from 260 to 764 psi (1.8 to 5.1 MPa). Shaking and heating are stopped 60 minutes later after pressure has decreased 20% to 321 psi (4.1 MPa). This gives a polymer emulsion that is coagulated by adding 100 ml of saturated aqueous MgSO4 with vigorous stirring. The precipitated polymer is collected by filtration and washed several times with warm water (70° C.). After drying in vacuum oven (100 mmHg) at 80° C. for 24 hours, 20 g of white polymer are obtained.
Polymer Analysis:
DSC, 10° C./min, N2, second heat: Tm at 200° C.
Composition 19F NMR (mol %): TFE/1,3,3,3-tetrafluoropropene/ethylene terpolymer (3/94/3)

The same experimental procedure is applied to Example 30 to 32 and the results are listed in Table 9.

TABLE 9

TFE-1,3,3,3 tetrafluoropropene-Ethylene Terpolymer

| Example # | | 29 | 30 | 31 | 32 |
|---|---|---|---|---|---|
| Material charge | | | | | |
| DI water | g | 220 | 220 | 220 | 220 |
| APS | g | 0.16 | 0.16 | 0.16 | 0.16 |
| $Na_2HPO_4.7H_2O$ | g | 1.30 | 1.30 | 1.30 | 1.30 |
| FS-10 | g | 5.30 | 5.30 | 5.30 | 5.30 |
| TFE | g | 50 | 50 | 40 | 20 |
| $CF_3CH{=}CHF$ | g | 9.4 | 17 | 45 | 60 |
| Ethylene | g | 3.13 | 8.3 | 15 | 20 |
| Reaction condition | | | | | |
| Temp | ° C. | 70 | 70 | 70 | 70 |
| Init pressure | MPa | 5.1 | 4.9 | 4.5 | 3.8 |
| final pressure | MPa | 4.08 | 3.1 | 2.8 | 2.2 |
| Time | min | 200 | 300 | 450 | 600 |
| Product | | | | | |
| Polymer | g | 20 | 15 | 15 | 10 |
| Thermal data | | | | | |
| Tg | ° C. | | | 130 | 90 |
| Tm | ° C. | 200 | 180 | | |
| 5 wt % loss of polymer in air | ° C. | 300 | 280 | 250 | 200 |
| Polymer composition by $^{19}F$ NMR | | | | | |
| TFE | mol % | 94 | 85 | 75 | 65 |
| $CF_3CH{=}CHF$ | mol % | 3 | 9 | 15 | 20 |
| Ethylene | mol % | 3 | 6 | 10 | 15 |

The copolymers 29 and 30 exhibit crystallinity (Tm, but no Tg), and the copolymers of Examples 31 and 32 are amorphous (no Tm, but have Tg) and can be melt formed into films that can be used for coating substrates.

When the combination of 1234ze and ethylene increases from 15 mol % (Example 30) to 25 mol % (Example 31), the resultant copolymers change from exhibiting crystallinity to being amorphous. Most of this change is attributed to the presence of the 1234ze because of its greater molecular size than the ethylene. Preferably, the combination of 1234ze and ethylene in the 1234ze/TFE/ethylene copolymer and the 1234ze/TFE/HFP/ethylene copolymer is at least 20 mol % to obtain the copolymer in the amorphous state.

Example 33—CTFE/ethylene/1234ze Copolymer

A 1 L autoclave is charged with distilled deoxygenated water (500 mL), Capstone® FS-10 (5.30 g), disodium hydrogen phosphate (1.3 g) and ammonium persulfate (0.16 g), cooled, evacuated and nitrogen flushed. Ethylene (40 g), CTFE (200 g) and 1,3,3,3 tetrafluoropropene (3 g) are then charged to the autoclave at 0° C. The autoclave is stirred and heated to 70° C. for 2 hours. This gives a polymer emulsion that is coagulated by adding 150 ml of saturated aqueous MgSO4 with vigorous stirring. The precipitated polymer is collected by filtration and washed several times with warm water (70° C.). After drying in vacuum oven (100 mmHg) at 80° C. for 24 hours, 25 g of white polymer are obtained.
DSC, 10° C./min, N2, second heat: Tm at 241° C.
Composition $^{19}F$ NMR (mol %): Ethylene/CTFE/1, 3,3,3 tetrafluoropropene terpolymer (47/51/2)

What is claimed is:

1. A copolymer comprising 1 to 40 mol % 1,3,3,3 tetrafluoropropene, 15 to 60 mol % vinylidene fluoride, 5 to 25 mol % tetrafluoroethyene, and 15 to 40 mol % perfluoro(alkyl vinyl ether), to total 100 mol %.

2. The copolymer of claim 1 wherein said perfluoro(alkyl vinyl ether) is perfluoro(methyl vinyl ether).

3. The copolymer of claim 1 wherein said copolymer is a fluoroelastomer.

* * * * *